Nov. 13, 1934.  H. B. GILLETTE  1,980,265
ANTISKID DEVICE
Filed Feb. 20, 1933

INVENTOR.
HERBERT B. GILLETTE
BY
ATTORNEYS.

Patented Nov. 13, 1934

1,980,265

UNITED STATES PATENT OFFICE 1,980,265

ANTISKID DEVICE

Herbert B. Gillette, Eau Claire, Wis., assignor to Gillette Rubber Company, Eau Claire, Wis., a corporation of Wisconsin Application February 20, 1933, Serial No. 657,568

10 Claims. (Cl. 152—14)

This invention relates to anti-skid devices or traction elements for use in connection with automotive vehicle tires and has for its object to provide such a device of simple construction and so made that it may readily be secured to the tread surface of a tire, or a portion thereof.

The advantages of my present invention from the standpoint of simplicity, durability and ease of assembly will be brought out in detail as the description of my invention proceeds.

For the purpose of illustration, I append hereto a drawing showing a practical embodiment of my invention; but it will be understood that I do not limit myself to the details of construction therein disclosed. As will be apparent to those skilled in the art, the invention may be embodied in other forms without sacrificing any of its advantages and without departing from the scope of the invention as defined in the appended claims.

Figure 1:
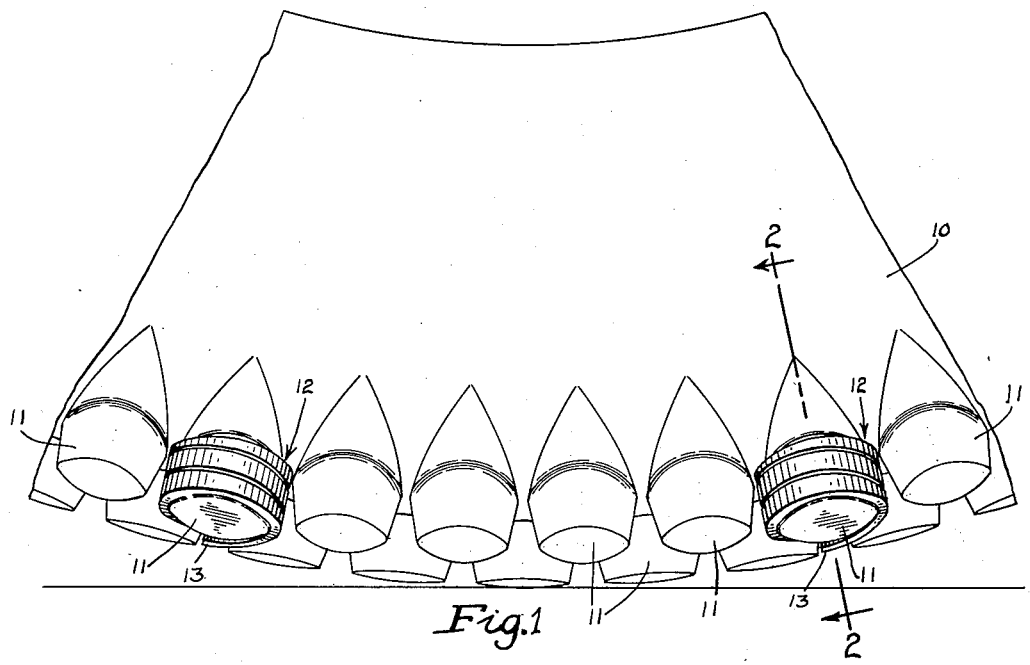
Fig. 1 is a view in side elevation of a fragment of a tire having the anti-skid device or traction element of my invention applied thereto.

Referring now to the drawing, reference numeral 10 indicates the side wall of a tire which is provided upon the tread surface with a plurality of independent studs or calks 11. It is unnecessary for the purposes of my present application to describe in detail the construction of the tire itself. I have chosen for the purposes of illustration in this case to show a tire which is substantially of the same construction as that shown in my co-pending application, Ser. No. 644,926, filed November 30, 1932.

The tire described in my said application, and as partially shown in Fig. 1 of the drawing hereto attached, includes a tread surface which is composed of a plurality of independent separated studs or calks of considerable depth and which, therefore, project from the undertread of the tire somewhat like a plurality of separate fingers or gripping elements.

The invention of my present application resides in an anti-skid device or traction element which may be applied to tires such as shown in my said co-pending application and to other tires in which the tread surface includes individually separated blocks or projections of rubber.

The anti-skid device or traction element of my invention is designated in the drawing by the general reference character 12 and comprises an helically coiled metal bar. This bar is shown in the drawing to be substantially triangular in cross-section and while this form of bar has its particular advantages, it will be understood that I do not limit myself to that exact form.

The anti-skid device 12 may be secured to the tire by screwing the same on to one of the studs or calks 11. When it is so positioned, as will be seen from Fig. 2, the rubber of the stud or calk is compressed or squeezed into the convolutions of the metal coil, thus assuring a firm and practically permanent attachment. When in final position upon the stud or calk, the anti-skid device is substantially flush with the outer surface of the stud or calk, or it may project slightly beyond the same.

Figure 2:
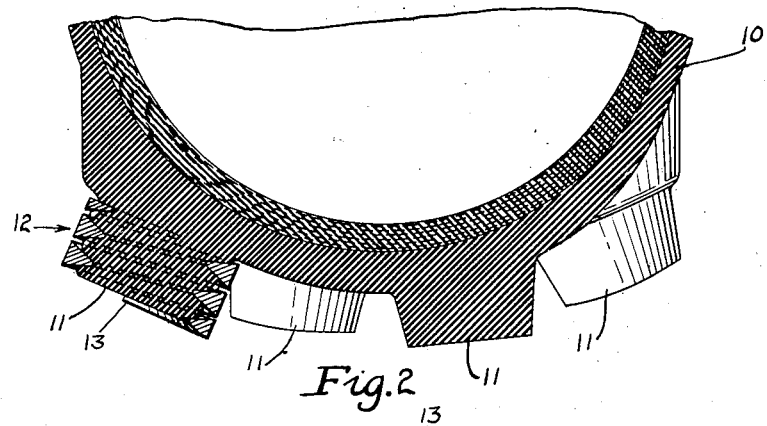
Fig. 2 is a view in cross-section taken substantially on the line 2—2 of Fig. 1.
Figures 3, 4, 5:
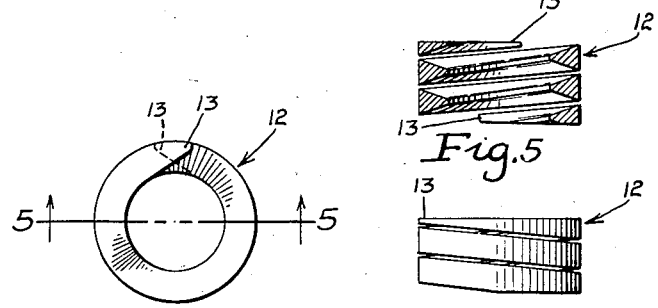
Fig. 3 is a plan view of my anti-skid device or traction element.
Fig. 4 is a view in side elevation of my anti-skid device or traction element.
Fig. 5 is a sectional view taken substantially on the line 5—5 of Fig. 3.

As will also be seen from an inspection of Fig. 2, the convolutions of the device 12 are slightly separated when the device is in position, thus providing a yielding coiled spring which is compressed when that portion of the tire contacts with the ground.

The ends of the coil comprising the device 12 may be tapered or reduced in thickness, as at 13, so that the circumferential edges of the coil lie in substantially one plane.

In connection with such a tire as is disclosed in my said co-pending application, it is not necessary that each of the studs or calks be provided with one of my anti-skid devices in order effectually to prevent skidding or sidewise movement of the tire or to improve its traction qualities. The anti-skid device may be arranged upon only certain of the calks or studs, for example, upon every sixth calk on each side of the tread surface of the tire. Moreover, the anti-skid device may be arranged upon the calks to form any desired pattern, with the idea in mind that the arrangement shall be such as to effectually prevent skidding and also to improve traction.

The anti-skid device of my invention is exceedingly simple in construction in that it comprises a single part which, of course, cannot get out of order and which, when attached, will remain permanently in place. This anti-skid device may be put upon the tire at the factory and remain thereon throughout the life of the tire; that is to say, my anti-skid device is not of the type which is used only during the winter season and which is removed when road conditions improve in the spring and summer. Once put in place, my anti-skid device remains on the tire and at all times enhances the wearing qualities as well as traction.

It will be understood, of course, that anti-skid devices of my invention may be made up and sold as separate units to be attached by the purchaser to a tire. Obviously, the shape of the device may be changed to conform to the shape of the projections upon any other form of tire than that disclosed in this application.

My anti-skid device has proved very successful in actual use and has shown that the traction qualities of the tire were materially improved and that skidding is effectually eliminated. Moreover, as an additional advantage, the use of these anti-skid devices upon this sort of tire tends to prolong the life of the tire.

There are now upon the market a number of tires which have deeply cut tread surfaces and which are so arranged as to provide independent separated rubber blocks or projections. An anti-skid device such as that disclosed in my present application may with ease be constructed to conform to any of such tires.

I claim:

1. An anti-skid device and traction element for tires comprising a coiled metal spring adapted to surround a projection formed on the tread surface of the tire, the coils of said spring being arranged to permit portions of said projections to be compressed therebetween, when the device is secured thereto.

2. An anti-skid device and traction element for tires comprising a coiled metal bar adapted to be screwed onto a projection formed on a tire, and whereby portions of said projection will be compressed between the convolutions of said bar.

3. An anti-skid device and traction element for tires comprising a coiled metal bar of substantially triangular cross-section adapted to be screwed on to a projection formed on the tread surface of the tire.

4. The combination with a tire having a tread surface composed of a plurality of individual projections, of spiral anti-skid devices adapted to be screwed on to certain of said projections, whereby portions of said projections will be compressed between the convolutions of said devices.

5. The combination with a tire having a tread surface comprising a plurality of individual projections, of individual spiral anti-skid devices adapted to be attached to and surrounding certain of said projections with portions thereof seated between the convolutions of said device.

6. The combination with a tire having a tread surface comprising a plurality of individual projections, of anti-skid devices comprising metal coils adapted to be screwed onto certain of said projections.

7. The combination with a tire having a tread surface comprising a plurality of individual projections, of anti-skid devices comprising metal coils surrounding certain of said projections, with portions of said projections compressed between convolutions of said coils.

8. A tire for automotive vehicles having a tread surface composed of a plurality of yielding projections, some of which are surrounded by metal coils, and portions of said projections being compressed between said coils.

9. A tire for automotive vehicles having a tread surface composed of a plurality of rubber projections, some of which are surrounded by coiled anti-skid devices whose convolutions are spaced apart to permit portions of said projections to be compressed therebetween.

10. The combination with a tire having a tread surface comprising a plurality of projections, of individual anti-skid devices adapted to be secured to certain of said projections, each of said devices comprising a plurality of spiral coils arranged in close proximity, and the inside diameter of each of said devices being less than the diameter of said projections, whereby portions of said projections will be compressed between said coils when said anti-skid devices are secured thereto.

HERBERT B. GILLETTE.